United States Patent [19]

Buck et al.

[11] Patent Number: 4,597,265
[45] Date of Patent: Jul. 1, 1986

[54] CONTROL SYSTEM FOR AIR CHARGE PRESSURE IN AN INTERNAL COMBUSTION ENGINE

[75] Inventors: Rainer Buck, Tamm; Wolf Wessel, Oberriexingen; Gerhard Stumpp, Stuttgart, all of Fed. Rep. of Germany

[73] Assignee: Robert Bosch GmbH, Stuttgart, Fed. Rep. of Germany

[21] Appl. No.: 785,849

[22] Filed: Oct. 9, 1985

[30] Foreign Application Priority Data

Oct. 18, 1984 [DE] Fed. Rep. of Germany ....... 3438176

[51] Int. Cl.$^4$ .............................................. F02B 37/00
[52] U.S. Cl. ...................................... 60/602; 60/600; 60/611
[58] Field of Search ................. 60/600, 601, 602, 603, 60/611

[56] References Cited

U.S. PATENT DOCUMENTS 4,174,617 11/1979 Jalali-Karchay ...................... 60/602
4,476,682 10/1984 McInerney ............................ 60/602

Primary Examiner—Douglas Hart
Attorney, Agent, or Firm—Frishauf, Holtz, Goodman & Woodward

[57] ABSTRACT

The air charge pressure sensor of the control system for a turbo supercharger of an internal combustion engine measures absolute charge pressure, but is used, in the idling condition of the engine, to measure atmospheric pressure, which is stored when the engine is idling for deriving the relative charge pressure for the control system.

6 Claims, 6 Drawing Figures

CONTROL SYSTEM FOR AIR CHARGE PRESSURE IN AN INTERNAL COMBUSTION ENGINE

This invention concerns a system for control of the air charge pressure in an internal combustion engine equipped with an adjustable turbo supercharger driven by exhaust gas in which the control of the turbo supercharger is regulated by a control loop in which a charge pressure sensor provides a signal indicative of the actual charge pressure.

It is known to control the supercharger pressure of an internal combustion engine in a manner dependent upon the comparison of the actual air charge pressure with a desired or reference air charge pressure. In such a system, the actual air charge pressure is measured by means of an air charge pressure sensor which is usually constituted as a differential pressure sensor and accordingly measures the pressure difference between the air charge pressure at the engine and the atmospheric pressure of the ambient air. What is measured, then, is the so-called relative air charge pressure. For control of air charge pressure alone, this relative air charge pressure is quite sufficient. For more extensive control of the internal combustion engine, on the other hand, the relative air charge pressure is not usable and, instead, under certain circumstances the absolute air charge pressure or the atmospheric air pressure, or both, are needed.

SUMMARY OF THE INVENTION

It is an object of the invention to provide various useful measurements of pressure in a vehicle equipped with automatic control of a turbo supercharger or its engine at minimum additional expense so that more sophisticated control of the engine may be possible and warnings of a malfunction may more readily be provided.

Briefly, recognizing that in the idling condition of the engine the air charge sensor, even if it measures absolute pressure, is measuring merely the atmospheric pressure, the pressure measured under such conditions is stored and is then used together with the absolute pressure, to produce a signal corresponding to relative pressure for the turbo supercharger control (by comparison with a reference value of relative pressure). Thus, both the atmospheric pressure and the absolute air charge pressure are also available for control purposes. It is also possible that the storage of the measured pressure under some other defined conditions of operation of the engine may likewise lead to useful control magnitudes. The atmospheric pressure may be utilized to provide an altitude signal for engine control, for example.

It is particularly useful to monitor the pressure values obtained in accordance with the invention by comparing them with the signal of an engine, air throughput quantity meter, since malfunction of the air charge control system can thereby be readily detected by the observance of concurrent measurements that are not consistent with normal operation of the engine.

BRIEF DESCRIPTION OF THE DRAWING

The invention is described in further detail by way of two illustrative examples with reference to the annexed drawings, in which.

DESCRIPTION OF THE ILLUSTRATED EMBODIMENTS

Both of the illustrated embodiments show a portion of an air pressure control system of an internal combustion engine equipped with an adjustable supercharger, the engine not being shown and the supercharger and its control being shown only in a simplified fashion, except for the portions that relate to the invention. The invention is not limited in its application to any particular kind of engine and may be used in connection with diesel, gasoline and other internal combustion engines. The system of the invention is likewise not limited to any particular implementation technology, being capable of being constituted either by analog electric circuits, for example, or by circuits built around a programmed digital computer. Consequently in the following description, the signals referred to may be regarded just as well as analog voltages or as various kinds of digital signals, whether pulse code modulated, pulse amplitude modulated and, in the latter case, as signals in which the information is provided in a variable keying ratio.

Figure 1:
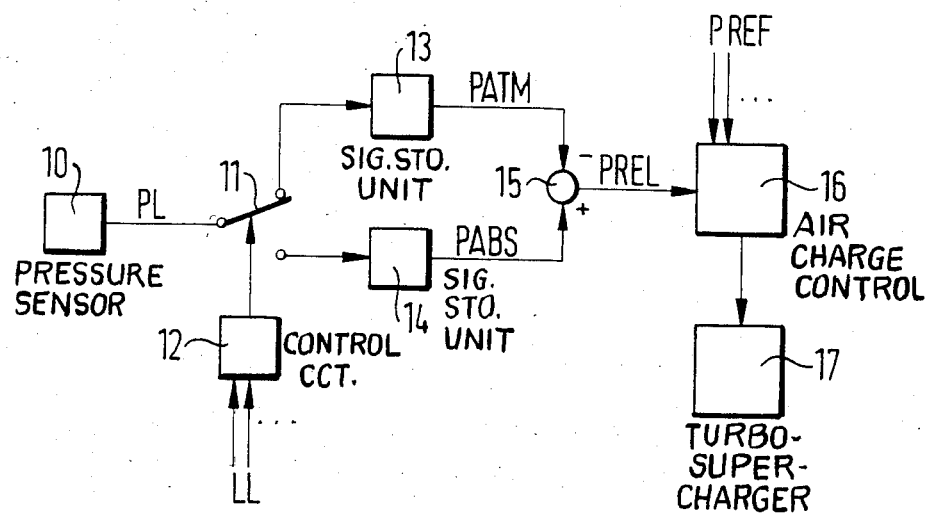
FIG. 1 is a block circuit diagram of a first embodiment of the invention.

FIG. 1 shows an air charge pressure sensor 10 which provides an output signal PL which is supplied to a changeover switch 11. The changeover switch 11 is controlled by a control circuit which responds to at least one input signal, for example a signal LL which is indicative of an idling operation of the engine. The upper output terminal of the changeover switch 11 is connected to a signal storage unit 13, the output of which is designated PATM. The lower output terminal of the changeover switch 11 is connected to a second signal storage unit 14, the output of which is designated PABS. A difference circuit 15 detects the difference in magnitude between its two input signals and provides as an output the difference signal PREL. In the abbreviated designations of these signals P signifies pressure and three following letters qualify the kind of pressure value (atmospheric, absolute and relative, respectively). The signal PREL is supplied to the air charge pressure control system 16 for comparison with a reference pressure signal PREF in order to provide a suitable control signal to the turbo supercharger 17 by which its configuration may be altered so as to bring the PREL signal closer to the contemporary reference pressure signal PREF. That can be done because the resulting change in air charge pressure is measured by the pressure sensor 10, thus completing the control loop.

The air pressure charge sensor 10 of FIG. 1 measures a pressure corresponding to the charging pressure at the engine compared to full vacuum. In other words, the signal PL represents an absolute pressure value. If the engine is operating in idling condition, as detected by the signal LL, the signal PL is supplied to the storage unit 13. Since the engine is idling and therefore there is no supercharging, in this operating condition of the engine, the pressure measured by the air charge sensor 10 corresponds to the atmospheric pressure PATM. This atmospheric pressure is stored in the storage unit 13 until it is replaced by a new measurement of atmospheric pressure and the output of that storage unit 13 is taken account of in the air charge pressure control unit 16 through the difference circuit 15.

If the engine is not idling, however, the signal PL is supplied to the storage unit 14. Since the engine is not idling, the turbo supercharger is operating and there is supercharging of the engine. For this reason, the signal PL corresponds to the absolute air charging pressure PABS present at the engine. This absolute air charge pressure PABS is stored in the storage unit 14 until it is replaced by a later measurement (in other words, the storage units 13 and 14 are so-called buffer storage units) and the output of the storage unit 14 is likewise taken account of through the difference circuit 15 by the air charge control 16. As is evident, then, the output of the difference circuit 15 is the relative charge pressure PREL obtained by subtracting the atmospheric pressure PATM from the absolute air charge pressure PABS. The charging air pressure control 16 can thus control the turbo supercharger 17 in such a way that the pressure PREL corresponds to the desired air charge pressure value PREF.

It is accordingly possible with the system of the invention, beginning with the pressure signal PL measured by the air charge pressure sensor 10 under particular operating conditions of the engine to obtain a signal representative of the atmospheric air pressure PATM, a signal representative of the absolute air charge pressure PABS and also a signal representative of the relative air charge pressure PREL. This means, in general, that further characteristic pressure magnitudes can be derived from the pressure measured by the air charge pressure sensor.

In the system of the invention illustrated in FIG. 1 of the drawing, it is now possible for the storage circuits 13 and 14 not only to store temporarily the above-described signals, but also to carry out particular signal adjustments. It is also possible that in particular applications either one or even both storage circuits can be omitted. Such an embodiment is shown in FIG. 2.

Figure 2:
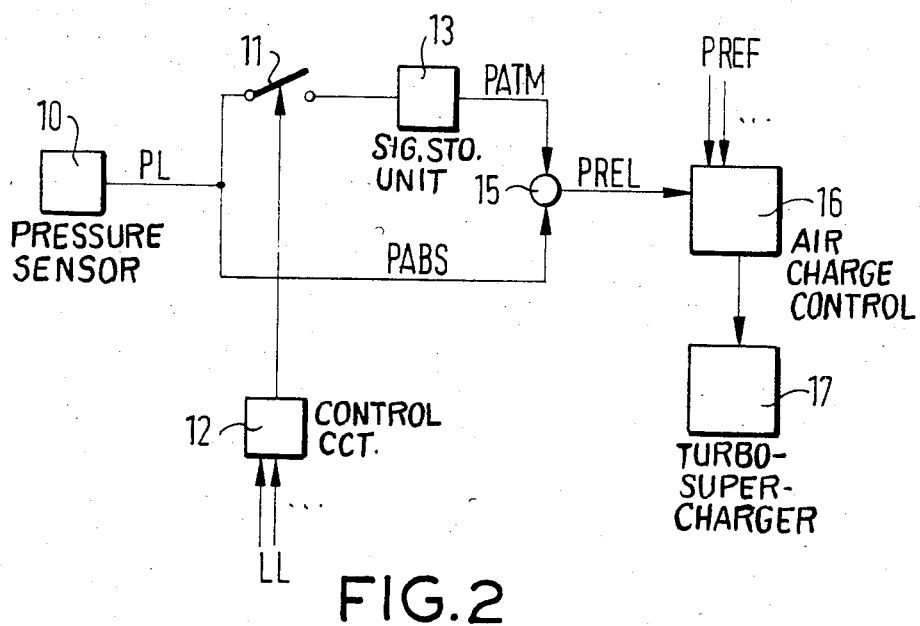
FIG. 2 is a block circuit diagram of a second embodiment of the invention.

FIG. 2 corresponds in principle to the configuration of FIG. 1, except that the storage circuit 14 is no longer present in FIG. 2, so that the changeover switch 11 has now become an interruptor 11'. In other respects FIG. 2 corresponds, in a basic sense, to the manner of operation described in FIG. 1.

Furthermore, in the system of the invention the dependence of the operation of the switch 11 or the interruptor 11', by the control circuit 12 may be tied not only to the idling speed operating condition of the engine, but also to other operating characteristic magnitudes of the engine, thus, for example, dependency on the rotary speed of the engine. In this case, the charge pressure sensor 10 is connected with the storage circuit 13 only when the engine speed lies in a defined predetermined speed range. In general, the switchover or interruptor operation can be made dependent in a similar manner on other magnitudes. What is important is only that the switchover point should be so chosen that the storage circuit 13 is only supplied with the signal PL when the charge pressure sensor actually measures only the atmospheric pressure of air.

Figure 3:
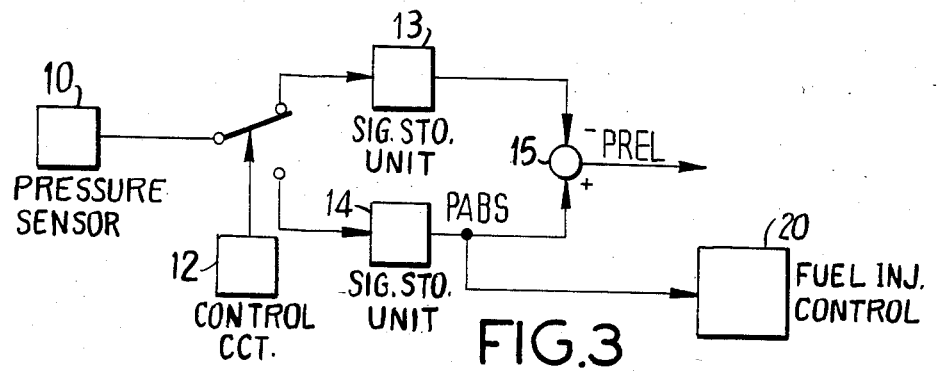
FIG. 3 is a block circuit diagram illustrating the use of the invention for control of fuel injection for smoke limiting.
Figure 4:
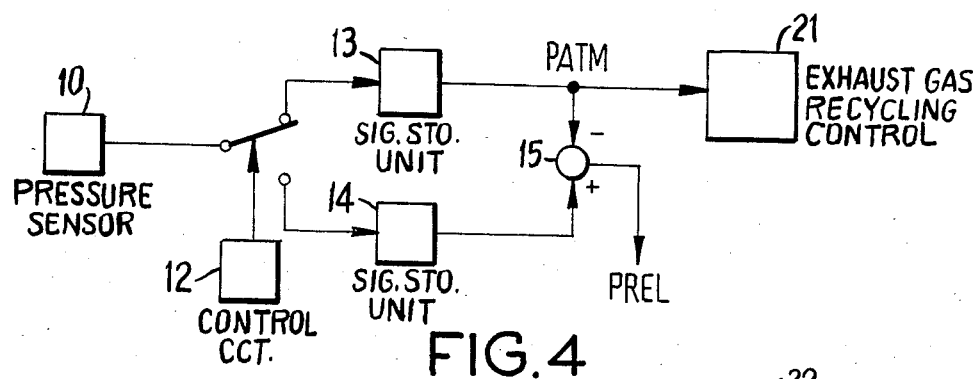
FIG. 4 is a block circuit diagram illustrating the use of a measurement of atmospheric pressure in accordance with the invention to provide altitude correction for exhaust gas recycling.
Figure 5:
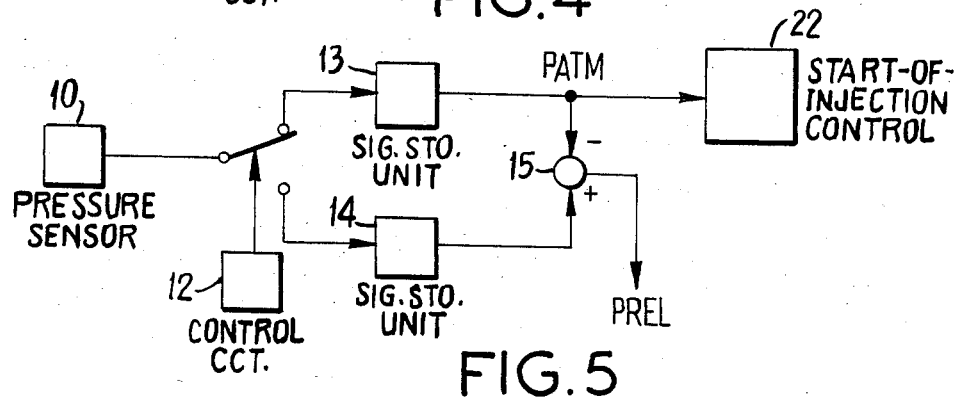
FIG. 5 is a block circuit diagram illustrating the use of atmospheric pressure measurement determined in accordance with the invention to provide an altitude correction for control of start of injection.

Thus it can be seen from FIGS. 1 and 2 of the drawings, the charge pressure control circuit 16 is controlled and activated by the relative charge pressure PREL. It is then also possible that in the case of this signal there is also involved a pressure signal dependent on the atmospheric pressure. At the same time, however, there remain provided in the apparatus of the invention both the atmospheric pressure PATM and the absolute charge pressure PABS. It is then particularly advantageous to utilize these available pressure magnitudes for control and/or regulation of other operating characteristic magnitudes of the engine. Thus, as in FIG. 3, the absolute charge pressure PABS can be utilized for limiting the evolution of exhaust smoke by control and/or regulation of the fuel quantities to be supplied to the engine. On the other hand, it is possible to carry out corrections dependent upon altitude by means of the atmospheric pressure PATM, and thereby to provide an altitude correction for exhaust gas recycling, beginning of fuel injection, etc., as shown in FIGS. 4 and 5 respectively.

A further advantage of the system of the invention consists in the increased precision of the measured relative air-charge pressure PREL, which is produced on the basis of the difference-forming circuit. This increased accuracy becomes noticeable, especially in the region of low charge pressures.

In the apparatus for practicing the invention above described, it is necessary that the internal combustion engine should some how or other be in a defined operating condition, for example idling condition, in order to measure, during operation under such conditions, the atmospheric pressure PATM. There is now the possibility that the engine, for example right after starting, or also during further phases of operation, should no longer run through the previously mentioned operating condition over a longer time. This has the consequence that during this time duration a change in the atmospheric pressure of air would not be recognized and thereby the control of the charge pressure of the engine can be falsified. It is therefore particularly advantageous to recognize such an error-prone operating condition of the air charge control by means of other procedures and/or apparatus and if possible to avoid it.

Figure 6:
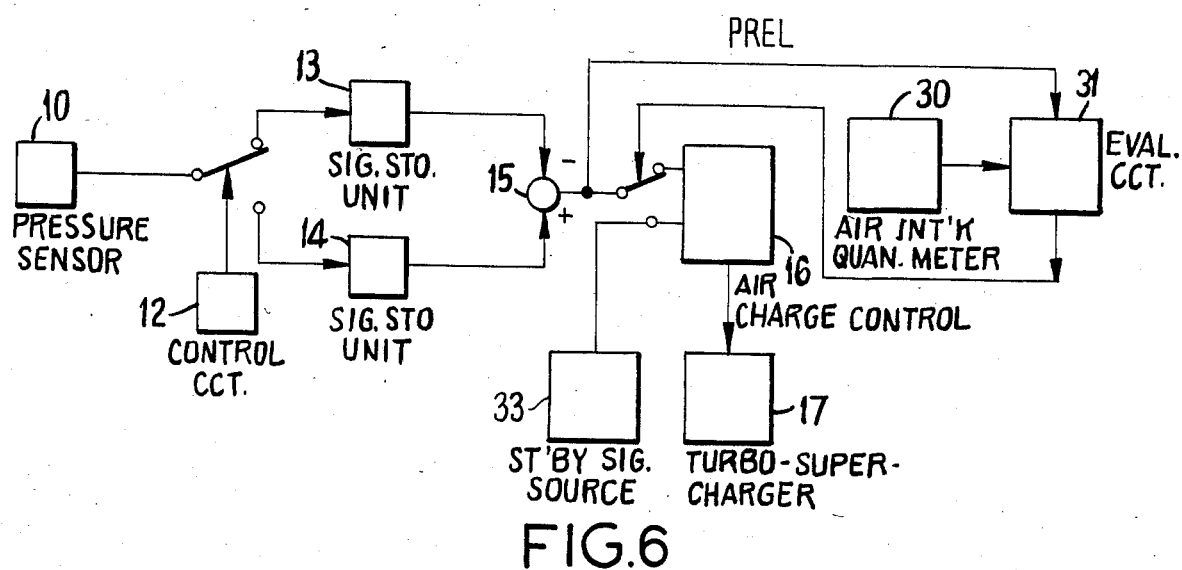
FIG. 6 is a block diagram of a system of the invention equipped with a disabling of air charge pressure control in certain cases of likely malfunction.

As shown in FIG. 6, it is possible to recognize by means of the output signal of an air quantity meter whether the air charge control has provided such a high value outside of the idling condition that the air quantity supplied to the engine has become greater that the predetermined upper limit value. In this case a malfunctioning operating condition of the air charge control would be recognized, requiring, for example, the shutting down of the air charge control system.

If the engine has not only the above-described air charge control, but also supplementarily an exhaust gas recycling system control, it has been found possible to recognize malfunctioning of the air charge control system by means of the output signal of the air quantity meter of the exhaust gas recycling control or to replace the function of the air charge pressure sensor 10. Thus if the engine is in idling condition and supercharging is at the same time not present and likewise there is no exhaust gas recycling, it is possible in this operating condition to determine the atmospheric pressure of air by the output signal of the air quantity meter. Thus, a malfunctioning condition of the air charge pressure control can be recognized by means of an air quantity meter and, with the assistance of further measures, for example the determination of the atmospheric pressure by the output signal of the air quantity meter, the malfunctioning operation can be corrected or eliminated.

The air charge pressure control can also be operated in a manner directly dependent upon the output signal of the air quantity meter. Of course it is also possible after recognition of a malfunctioning operating condition of the air charge pressure control, simply to switch that pressure control off. The air quantity meter can in these cases be a flap-type air quantity meter or a heated wire air quantity meter, these being devices that measure a quantity of air flowing past the device per unit of time.

The individual elements combined in the system of the invention are individually known. It will be recognized that although the invention has been described with reference to two illustrative examples, variations and modifications in circuit technology or modification of physical devices are possible within the inventive concept, as well as the use of the invention to develop somewhat different magnitudes or signals from the system or other applications of the signals so developed. What is important from the point of view of the invention is the derivation of different characteristic pressure magnitudes from a particular air charge pressure measurement.

The right-hand portion of the control systems of FIGS. 3–6 are conventional controls in every case. The fuel injection control 20 is of the kind that is normally used with an engine mode signal from throttle position or intake vacuum for avoiding the production of exhaust smoke by a correction of the amount of fuel injected under certain load conditions. In this case the absolute air charging pressure is used for making the correction of the amount of fuel injection for avoidance of smoke.

The exhaust gas recycling control 21 of FIG. 4 is likewise conventional and of the kind equipped for an altitude correction from an altimeter or aneroid barometer or by permanent setting. In this case altitude correction is obtained from the atmospheric pressure signal of the system of FIG. 1 or FIG. 2.

The fuel injection control 22 of FIG. 5 is a conventional fuel injection control system responsive to the accelerator pedal of a vehicle, of the kind in this case for which an altitude correction with the moment of beginning of injection can be made with an aneroid barometer. In this case, the atmospheric pressure signal of the system of FIG. 1 or FIG. 2 is used to provide the atmospheric pressure correction for fuel injection.

The air intake quantity meter 30 of FIG. 6 may be any of the types previously mentioned, whether or not included in an exhaust gas recycling system for measuring the air quantity rate of engine intake. An evaluation circuit 31, which may be a read-only memory, or a simpler device, determines whether the air intake quantity meter output and the relative charge in pressure PREL obtained from the system of FIG. 1 or FIG. 2 are consistent or inconsistent with normal operating ranges of the engine. If the inputs are inconsistent with normal operations, the evaluation circuit 31 interrupts the furnishing of a PREL signal to the air charge control unit 16 by throwing the switch 32 and providing a standby signal from the signal source 33, which may be a source of an adjusted constant voltage that in effect disables the regulation system 10, 11, 12, 13, 14, 15 and either turns the supercharger off or makes it operate at some predetermined charging rate.

We claim:

1. Control system for the air charge pressure supplied to an internal combustion engine equipped with an adjustable turbo supercharger, comprising means for comparing a measured air charge pressure with a reference air charge pressure and means for adjusting the supercharger to minimize the difference between said measured air charge pressure and said reference air charge pressure, said reference air charge pressure being variable according to conditions under which the engine is operated, said control system further comprising:

means for measuring absolute air charge pressure supplied to said engine for comparison in said system with said reference air charge pressure;

means for storing the measured air charge pressure which is measured during an idling condition of the engine as representative of the atmospheric pressure and means for deriving, from said measured absolute air charge pressure and from said stored value of air charge pressure representative of atmospheric pressure, a signal representative of relative air charge pressure for comparison with said reference air charge pressure.

2. System according to claim 1, including also means for measuring the quantity rate of the supply of air to said engine for monitoring, with reference to operating conditions of the engine, measured and derived values of air charging pressure for detection of malfunctions, said system including means for indicating in which of at least two sets of operating conditions said engine is operating for evaluation of the correlation of air pressure and air quantity measurement indications.

3. System according to claim 2, including means for shutting off the control system for the air charge pressure supplied to the engine when air quantity measurement and air charging pressure measurement indications are inconsistent with normal engine operation.

4. Apparatus according to claim 1, in which means are provided responsive to said storage value representative of atmospheric air pressure for altitude correction of exhaust gas recycling for said engine.

5. Apparatus according to claim 1, in which means are provided responsive to said storage value representative of atmospheric air pressure for altitude correction of the instant of beginning fuel injection for said engine.

6. System according to claim 1, in which means are provided which are responsive to said absolute air charge pressure for initiating the mode of control of the fuel supply to said engine for exhaust smoke limiting.

* * * * *